United States Patent Office 3,142,203
Patented July 28, 1964

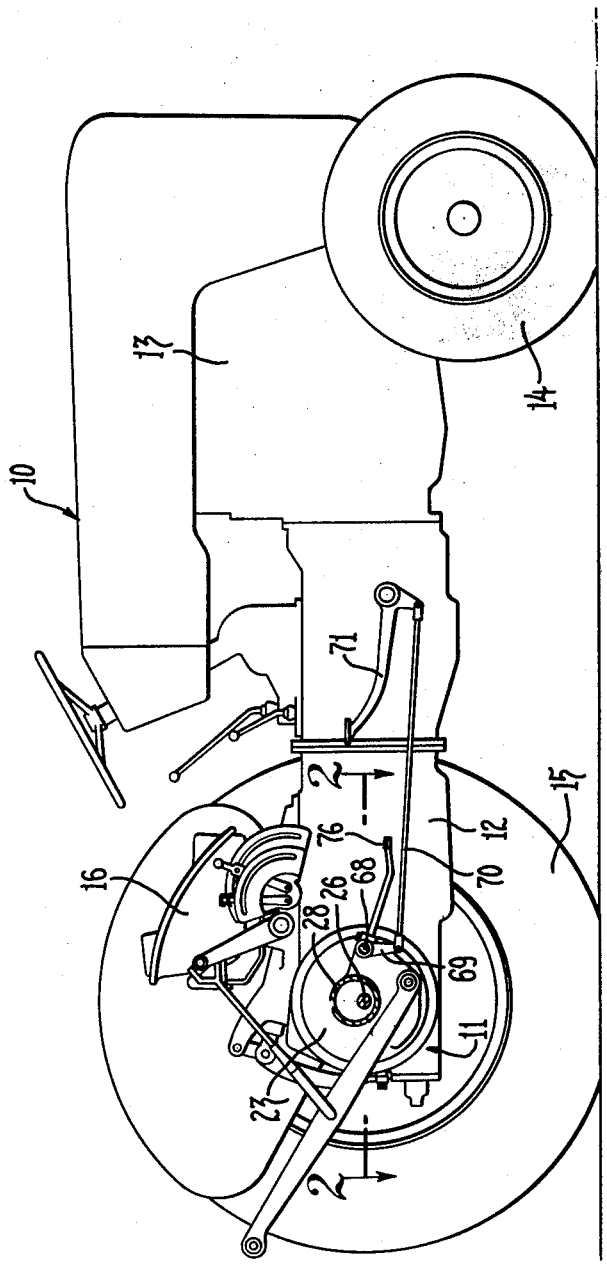

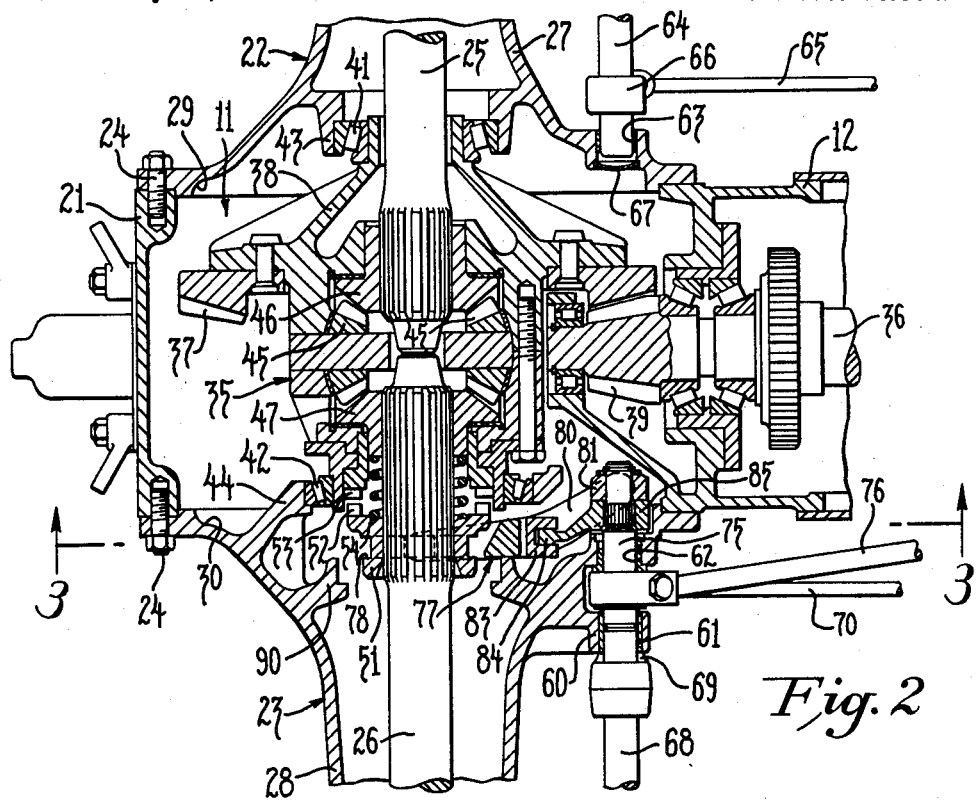
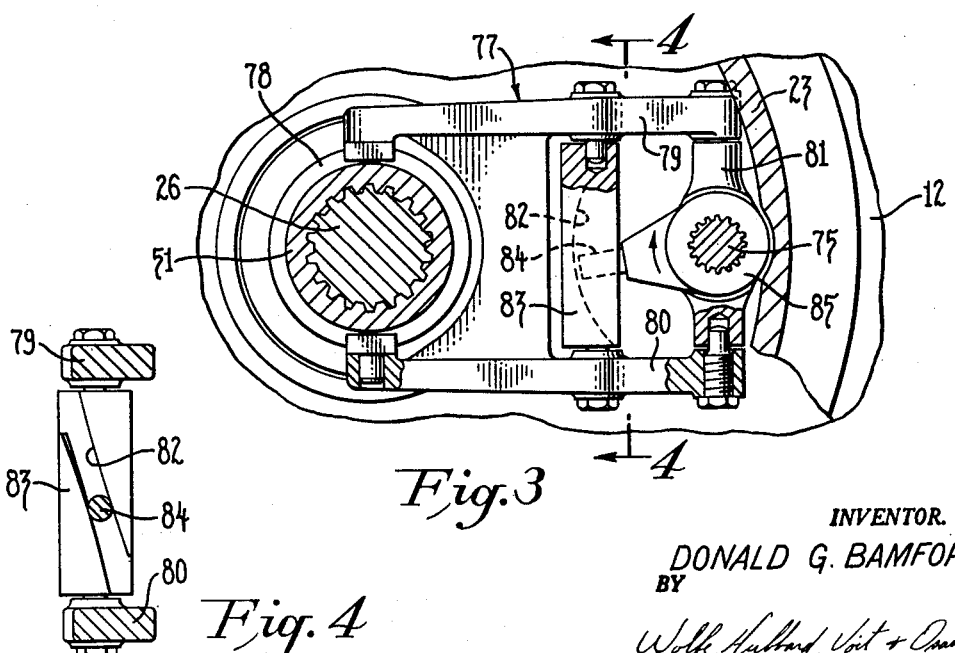

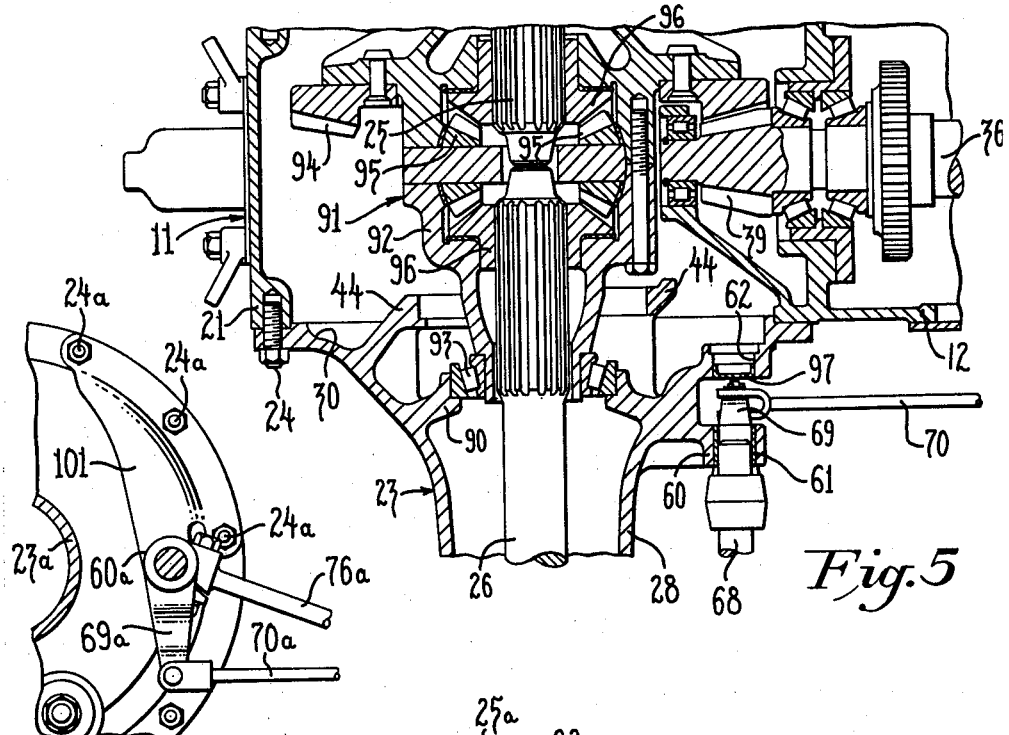
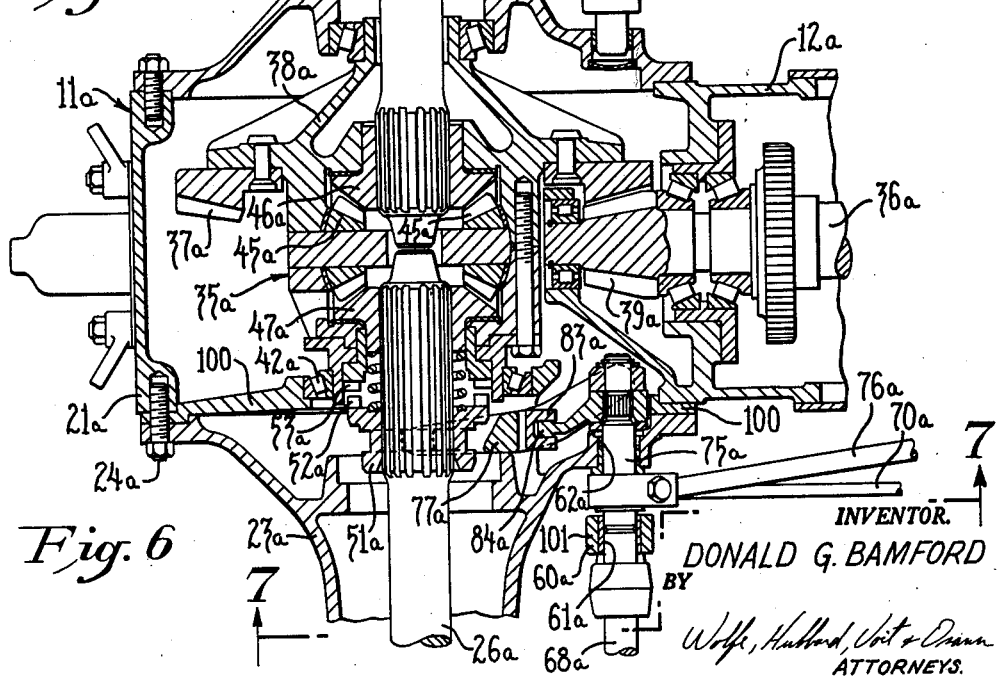

3,142,203
TRACTOR DIFFERENTIAL LOCK
Donald G. Bamford, Detroit, Mich., assignor to Massey-Ferguson Inc., Detroit, Mich., a corporation of Maryland
Filed July 27, 1961, Ser. No. 127,251
3 Claims. (Cl. 74—710.5)

The present invention relates generally to vehicle drive differential gearing and concerns, more particularly, a differential locking arrangement particularly well suited for tractor use.

Differential gearing is commonly provided between the drive shaft and the oppositely extending drive axles of a vehicle so as to allow relative rotation between the drive wheels while powering the vehicle. With such gearing, loss of traction at one drive wheel tends to interrupt power flow to the other wheel and results in idle spinning of the slipping wheel.

To avoid this situation, tractors are often provided with lockable differentials which permit the operator, when difficult terrain is encountered, to "lock up" the differential gearing so that relative rotation between the drive axles is prevented and driving action is maintained at each drive wheel. Of course, for many uses tractors do not require lockable differentials and in such cases the more simple standard differentials are preferably used.

Accordingly, the primary aim of the invention is to provide a differential gearing assembly that permits economical and simple conversion between standard and lockable type so as to facilitate manufacturing and supplying problems.

More specifically, it is an object to provide a differential gearing assembly of the above type which utilizes a large number of parts and configurations which are common to both the standard and lockable modifications.

It is also an object to provide to differential gearing assembly as characterized above having a compact actuator which utilizes the conventionally provided brake shaft mounting opening so as to minimize the changes in forming and handling techniques required to manufacture the novel assembly as compared to conventional differentials.

A related object is to provide a differential gearing arrangement permitting present types of conventional differentials to be converted to lockable units in much the same way as the above-described assembly is freely convertible from standard to lockable type.

Other objects and advantages of the invention will become apparent upon reading the following detailed description and upon reference to the drawings, in which:

FIGURE 1 is a side elevation, partially in section, of a tractor embodying the invention;

FIG. 2 is an enlarged fragmentary section taken approximately along the line 2—2 in FIG. 1;

FIG. 3 is a further enlarged fragmentary section taken approximately along the line 3—3 in FIG. 2;

FIG. 4 is a fragmentary section taken along the line 4—4 in FIG. 3;

FIG. 5 is similar to FIG. 2 and shows an alternate modification;

FIG. 6 is similar to FIG. 2 and shows a modified form of differential embodying the invention; and FIG. 7 is a fragmentary section taken approximately along the line 7—7 in FIG. 6.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning to the drawings, there is shown a tractor 10 having a differential gearing assembly 11 constructed in accordance with the invention. The tractor 10 includes a body 12 having, at its forward end, a power plant 13 and being supported by front steering wheels 14 and rear drive wheels 15. An operator's seat 16 is mounted at the rear of the body 12 between the drive wheels 15 and above the differential gearing assembly 11.

Enclosing the differential assembly 11 is a differential case 21 forming a portion of the tractor body 12 (see FIG. 2). A pair of axle housings 22 and 23 are secured by a plurality of screws 24 on either side of the differential case 21, and axles 25 and 26 for the right and left drive wheels 15 are rotatably supported in the respective housings 22, 23. The respective axle housings 22, 23 are formed with generally cylindrical body portions 27 and 28 which expand into flared ends 29 and 30 that open into the differential case 21.

For driving the axles 25, 26, the assembly 11 includes a differential gear 35 which couples a drive shaft 36 extending from the power plant 13 to the respective axles. The differential gear 35 includes a ring gear 37, mounted on a carrier 38, which is driven by a pinion gear 39 on the drive shaft 36. The carrier 38 is journalled in bearings 41 and 42 which are mounted in bearing seats 43 and 44 formed integrally with the respective axle housings 22, 23. A set of planet gears 45 are journalled on the carrier 38 in meshing engagement with a pair of bevel gears 46 and 47 splined, respectively, on the axles 25, 26.

As so far described, the differential gear 35 functions conventionally with power from the drive shaft 36 being imparted to the carrier 38 through the pinion 39 and the ring gear 37. The rotated carrier 38 drives the axles 25, 26 through the planet gears 45 with relative rotation between the axles being permitted by the journalled mounting of the planet gears 45 and the rotatable support between the carrier 38 and the axle bevel gears 46, 47.

The differential gear 35 is of the lockable type and to provide the locking function, a locking element 51 is slidably splined on the axle 26 and is formed with a set of teeth 52 which are opposed to, and cooperate with, a set of corresponding teeth 53 formed on the carrier 38. A compressed helical spring 54 is interposed between the locking element 51 and the axle bevel gear 47 so as to bias the locking element in the direction tending to separate the teeth 52, 53.

As will be understood to those skilled in the art, sliding the locking element 51 against the force of the spring 54 so as to engage the teeth 52, 53 causes the carrier 38 to be rotatably locked to the axle 26 with the result that no differential action in the gear 35 can take place. Thus, with the teeth 52, 53 in engagement, the differential gear 35 is locked and a direct drive is positively maintained from the drive shaft 36 to each of the axles 25, 26.

In carrying out the invention, the axle housing 23 is provided with a lug 60 which supports a brake shaft bearing 61 that is spaced from, but alined with, an opening 62 conventionally located in the flared end 30 of the housing 23 to support a rear wheel brake shaft. The opposite housing 22 is formed in the conventional manner with an opening 63 journalling a brake shaft 64 which is rocked by a pull rod 65 coupled to an arm 66 secured to the brake shaft. The inner end of the opening 63 is sealed by a cap 67. The shaft 64 controls the brake for the left rear drive wheel 15.

To operate the brake associated with the opposite rear drive wheel, a brake shaft 68 is journalled in the bearing 61 and is provided with an arm 69 secured to a pull rod 70. The pull rod 70 extends forwardly of the tractor and is connected to a brake pedal 71 which permits the operator of the tractor to rock the brake shaft 68 and thus apply the brakes.

For controlling the lockable differential gear 35, a control shaft 75 is journalled in the opening 62 and is piloted in the bearing 61. The control shaft 75 is coupled to the locking element 51 so that oscillation of the shaft locks and unlocks the differential gear 35, and a differential locking operator in the form of a pedal 76 is secured to the shaft 75 between the lug 60 and the opening 62 for oscillating the shaft.

In the preferred construction, the control shaft 75 is coupled to the locking element 51 by a shifter fork 77 which is operated by a cam and follower connection. The shifter fork 77 engages a peripheral groove 78 formed in the locking element 51 and the fork includes a pair of arms 79 and 80 which are rotatably pinned to opposite ends of a bar 81 that is rotatably supported on the inner end of the control shaft 75.

A cam slot 82 is formed in a bar 83 pivoted between the shifter fork arms 79, 80, and a cam follower pin 84 is secured to a collar 85 splined on the control shaft 75. The cam slot 82 is angled with respect to the axis of the control shaft 75 so that oscillation of the control shaft in the direction of the arrow in FIG. 3 swings the shifter fork 77 in a clockwise direction as seen in FIG. 2 so as to bring the teeth 52, 53 into engagement. It can thus be seen that depression of the pedal 76 by the tractor operator causes the differential gear 35 to become locked.

When the operator releases the pedal 76, the compressed spring 54 exerts a force tending to separate the teeth 52, 53. It may be desirable to select the force of this spring with regard to the slope of the cam slot 82 so that the spring alone will not unlock the differential until the tractor operator kicks the differential locking pedal 76 upwardly to return the parts to their illustrated positions.

It can be readily seen that the cam and follower connection for shifting the locking element 51 upon oscillation of the control shaft 75 is a particularly compact and sturdy assembly. The pivoted mounting of the bar 83 between the fork arms 79, 80 permits the slight rocking movement of the bar which is required to prevent binding of the cam follower 84 within the slot 82 during operation. The device thus operates smoothly and positively.

As a feature of the invention, the axle housing 23 is formed with a second integral bearing seat 90 in addition to the first bearing seat 44. The bearing seat 44 supports the lockable differential gear 35 in the manner described above. When a lockable differential is not desired, the gear 35 is replaced by a standard differential gear 91 (see FIG. 5) having a carrier 92 which is journalled in a bearing 93 held in the bearing seat 90. The gear 91 includes a ring gear 94 in meshing engagement with the pinion 39 on the drive shaft 36 and a set of planet gears 95 are journalled on the carrier 92 in meshing engagement with bevel gears 96 splined on the ends of the axles 25, 26.

With the standard differential 91 mounted within the differential case 21, the brake shaft 68 together with its operating linkage remains as described above and the opening 62 in the flared end 30 of the axle housing 23 is simply closed with a cap 97.

It can thus be seen that a very simple and economical conversion of the assembly 11 is permitted, with either the lockable differential gear 35 or the standard differential gear 91 being readily embodied in the assembly depending upon the use to which the tractor is to be put. In each modification, the same axle housing and same differential case is utilized. With the lockable differential gear 35 mounted in the bearing seat 44, the bearing seat 90 forms a convenient stop against which the spring 54 urges the shifter fork 77 when the parts are in their unlocked position. With the standard differential gear 91 mounted in the bearing seat 90, the seat 44 is well clear of the operating differential parts.

The mounting of the brake shaft 68 and its operating linkage remains unaffected by whether the standard or lockable differential gear is embodied in the assembly.

As a further important point, the machining equipment required to manufacture the axle housing 23 need not be extensively modified since the opening 62 in the flared end 30 and the opening in the lug 60 for supporting the bearing 61 are in alinement at the same position where a conventional brake shaft supporting opening is located.

In keeping with the invention, existing tractors can be easily and economically provided with lockable differential gear assemblies in the manner shown in FIGS. 6 and 7. In this modification, parts which correspond with those previously described have been given the same reference numeral with the distinguishing suffix "a" added. Thus, the assembly 11a includes a differential case 21a forming a part of the tractor body 12a and being secured to the flared ends of a pair of axle housings 22a and 23a. A lockable differential 35a couples a drive shaft 36a to alined, and oppositely extending, drive wheel axles 25a and 26a. The differential gear 35a includes a ring gear 37a mounted on a carrier 38a and driven by a pinion 39a on the drive shaft 36a. A set of planet gears 45a are journalled on the carrier 38a in meshing engagement with a pair of bevel gears 46a and 47a which are splined to the respective axles 25a, 26a.

To mount the lockable differential carrier 38a, a plate 100 is sandwiched between the case 21a and the axle housing 23a so that a plurality of screws 24a hold the case 21a, housing 23a and plate 100 rigidly together.

Also held by a number of the screws 24a is a bracket 101 (see FIG. 7) which extends outboard from the flared end of the axle housing 23a to define a lug 60a having a bearing 61a which supports a brake shaft 68a. The brake shaft 68a is operated by a pull rod 70a connected to the brake shaft by a depending arm 69a.

A differential control shaft 75a is journalled in the former brake shaft opening 62a and has its outer end piloted in the bearing 61a. A differential locking lever 76a is secured to the shaft 75a between the opening 62a and the lug 60a.

The control shaft 75a is coupled to a locking element 51a for the differential gear 35a by a shifter fork 77a operated by a cam bar 83a and pin follower 84a connection corresponding to, and operating as, the coupling described above in connection with the FIG. 2 modification.

It can thus be seen that converting or adapting the assembly 11a to embody the lockable differential gear 35a is particularly economical and easy. In addition to the lockable differential gear with its operating control shaft 75a, only two additional parts, the plate 100 and the bracket 101, are required. The lockable differential gear 35a and its operating linkage may be identical to the gear 35 so that the same unit can be used for both new tractor production as well as conversion of earlier tractors.

I claim as my invention:

1. A differential gearing assembly comprising, in combination, a differential case, an axle housing secured to and opening into said differential case, an axle journalled in said axle housing, a differential gear in said differential case coupled to said axle and having a member rotatable relative to said axle when differential action occurs, a locking element slidably mounted on said axle for movement into and out of locking engagement with said member, means biasing said element out of locking engagement with said member, said axle housing having a lug supporting a brake shaft bearing, an opening in said axle housing alined with said bearing, a shaft journalled in said opening and piloted in said bearing, a shifter fork coupled to said element and rotatably anchored to said shaft, a cam and follower connection between said fork and said shaft for shifting the element against said bias into locking engagement with said member upon oscillation of said shaft, and a pedal secured to said shaft outside of said axle housing between said opening and said lug for oscillating the shaft.

2. An axle housing comprising an integral casting having a generally cylindrical body with a flared end adapted to be bolted to a differential case, said casting having a pair of integral alternately usable bearing seats at said flared end for supporting, respectively, a standard differential gear and a lockable differential gear, said flared end having an opening disposed on an axis substantially parallel to said body, and said casting also having an integral lug with a bearing-supporting socket disposed on an axis coinciding with the axis of said opening, said lug being spaced from said flared end to permit a lever to be interposed therebetween.

3. A differential gearing assembly comprising, in combination, a differential case, an axle housing secured to and opening into said differential case, an axle journalled in said axle housing, a plate sandwiched between and secured to said case and said housing, a differential gear mounted in said plate and being coupled to said axle, said gear having a member rotatable relative to said axle when differential action occurs, a locking element slidably mounted on said axle for movement into and out of locking engagement with said member, a bracket secured to said housing and having a lug supporting a brake shaft bearing, an opening in said axle housing alined with said bearing, a shaft journalled in said opening and piloted in said bearing, means including a shifter fork coupling said shaft and said element for shifting the element into and out of locking engagement with said member upon oscillation of said shaft, and an operator secured to said shaft outside of said axle housing and between said opening and said lug for oscillating the shaft.

References Cited in the file of this patent

UNITED STATES PATENTS

| | | |
|---|---|---|
| 1,399,093 | Vincent | Dec. 6, 1921 |
| 2,570,191 | Beckwith | Oct. 9, 1951 |

FOREIGN PATENTS

| | | |
|---|---|---|
| 1,245,416 | France | Sept. 26, 1960 |